United States Patent
Zhu et al.

(10) Patent No.: US 11,218,977 B2
(45) Date of Patent: Jan. 4, 2022

(54) METHOD AND DEVICE FOR CONTROLLING INTERFERENCE

(71) Applicants: BEIJING XIAOMI MOBILE SOFTWARE CO., LTD., Beijing (CN); BEIJING UNIVERSITY OF POST AND TELECOMMUNICATIONS, Beijing (CN)

(72) Inventors: Yajun Zhu, Beijing (CN); Wei Hong, Beijing (CN); Chunhua Liu, Beijing (CN); Yong Li, Beijing (CN)

(73) Assignees: BEIJING XIAOMI MOBILE SOFTWARE CO., LTD., Beijing (CN); BEIJING UNIVERSITY OF POST AND TELECOMMUNICATIONS, Beijing (CN)

( * ) Notice: Subject to any disclaimer, the term of this patent is extended or adjusted under 35 U.S.C. 154(b) by 102 days.

(21) Appl. No.: 16/740,394

(22) Filed: Jan. 11, 2020

(65) Prior Publication Data
US 2020/0154367 A1     May 14, 2020

Related U.S. Application Data

(63) Continuation of application No. PCT/CN2017/094754, filed on Jul. 27, 2017.

(51) Int. Cl.
*H04W 52/24* (2009.01)
*H04L 5/00* (2006.01)
(Continued)

(52) U.S. Cl.
CPC ......... *H04W 52/244* (2013.01); *H04L 5/0073* (2013.01); *H04W 52/241* (2013.01);
(Continued)

(58) Field of Classification Search
CPC ............. H04W 52/244; H04W 52/241; H04W 52/325; H04W 72/042; H04W 72/0453;
(Continued)

(56) References Cited

U.S. PATENT DOCUMENTS

2011/0292983 A1* 12/2011 Ito ..................... H04L 25/03292
375/224
2015/0304062 A1* 10/2015 Teyeb ................. H04W 52/325
375/260
(Continued)

FOREIGN PATENT DOCUMENTS

| CN | 101779500 A | 7/2010 |
| CN | 102474829 A | 5/2012 |

(Continued)

OTHER PUBLICATIONS

Extended European Search Report in Application No. 17918906.3, dated Feb. 16, 2021.
(Continued)

*Primary Examiner* — Kiet Tang
(74) *Attorney, Agent, or Firm* — Syncoda LLC; Feng Ma

(57) ABSTRACT

A method for controlling interference includes: dividing a control region in a time domain transmission unit to obtain first and second power regions, the transmission power of the first power region being higher than that of the second power region; dividing all current channels to obtain first and second channel groups; transmitting data carried by all the channels included in the second channel group by means of the first power region, and transmitting data carried by all the channels included in the first channel group by means of the second power region. The method can greatly reduce interference to a PDSCH of a small cell from a PDCCH of a macro base station when the macro base station and the small cell use different parameter sets on the same carrier in
(Continued)

a heterogeneous network, without reducing the spectrum utilization rates of the macro base station and the small cell.

17 Claims, 10 Drawing Sheets

(51) Int. Cl.
*H04W 52/32* (2009.01)
*H04W 72/04* (2009.01)
*H04W 84/04* (2009.01)

(52) U.S. Cl.
CPC ....... *H04W 52/325* (2013.01); *H04W 72/042* (2013.01); *H04W 72/0453* (2013.01); *H04W 84/045* (2013.01)

(58) Field of Classification Search
CPC . H04W 84/045; H04W 52/265; H04W 52/10; H04W 52/143; H04W 52/346; H04W 92/10; H04W 72/082; H04L 5/0073; H04L 5/001; H04L 5/0044; H04L 5/0007
See application file for complete search history.

(56) References Cited

U.S. PATENT DOCUMENTS

2015/0319710 A1* 11/2015 Rao ........................ H04L 5/0053
                                                                    370/329
2017/0099129 A1*  4/2017 Buthler ................. H04L 1/0003

FOREIGN PATENT DOCUMENTS

WO      2014077746 A1    5/2014
WO      2016130175 A1    8/2016

OTHER PUBLICATIONS

English Version of International Search Report in Application No. PCT/CN2017/094754, dated Dec. 27, 2017.
Nortel:"UL Power Control with Fractional Frequency Reuse for E-UTRA", 3GPP TSG-RAN WG1#49bis, Orlando, FL USA, Jun. 25-29, 2007, R1-072761.

* cited by examiner

⊠ first power region

■ second power region

▨ reference signal or PCFICH

☐ PDSCH

METHOD AND DEVICE FOR CONTROLLING INTERFERENCE

CROSS-REFERENCE TO RELATED APPLICATION

This application is a continuation of PCT Application No. PCT/CN2017/094754 filed on Jul. 27, 2017, the disclosure of which is hereby incorporated by reference in its entirety.

BACKGROUND

In Long-Term Evolution-Advanced (LTE-Advanced) systems, the main role of cross-carrier scheduling is to provide Inter-Cell Interference Coordination (ICIC) support to a Physical Downlink Control Channel (PDCCH) in a heterogeneous network.

In the heterogeneous network, as shown in FIG. 1, a macro base station and a small base station share two downlink carrier components (CCs), which are assumed to be a CC1 and a CC2. Both the two CCs of the small base station operate at a low transmission power, the CC1 of the macro base station operates at a high transmission power, and the CC2 of the macro base station operates at a low transmission power. When a range extension technology is used in the small base station, transmission performed by the macro base station on the CC1 within a range extension region has a great interference on the CC1 of the small base station, whereas transmission performed by the macro base station on the CC2 has a weaker interference on the small base station because of low transmission power. Therefore, on the small base station, cross-carrier scheduling data of the CC1 using the PDCCH of the CC2 can improve the reliability of downlink control signaling, and the macro base station may not transmit the PDCCH on the CC2, but may use the CC1 to perform cross-carrier scheduling of data transmission on the CC2.

This cross-carrier scheduling mode provides the ICIC between the PDCCHs, and interference cancellation between physical downlink shared channels (PDSCHs) can continue to adopt the Release 8 ICIC mechanism. If the terminal within a range extension region of the small base station needs to receive downlink data on some resource blocks, the macro base station may avoid high-power PDSCH transmission on these resource blocks.

A flexible extensible orthogonal frequency division multiplexing (OFDM) numerology (parameter set) is introduced into a new radio (NR) to support different frequency bands/frequency categories and deployment modes. When slots corresponding to different numerologies contain an equal number of symbols, subcarrier spacing is inversely proportional to a slot length.

The NR supports a variety of different numerologies, and also supports carrier aggregation (CA) between the different numerologies. For the same CC, the macro base station and the small base station may have different numerology configurations for a carrier. That is, the slot length for the same carrier may vary at the macro base station and the small base station. The macro base station has a large coverage, and accordingly requires a long cyclic prefix (CP), but a large subcarrier spacing may increase the overhead of the CP. Therefore, generally, the subcarrier spacing of a CC configured on the macro base station is smaller than the subcarrier spacing of the same CC configured on the small base station. That is, for the same CC, the slot length of the macro base station is greater than that of the small base station, and the length of a control region of the macro base station is also greater than the length of a control region of the small base station.

If the macro base station and the small base station are both configured with the CC1 and the CC2, a transmission power of the macro base station is larger on the CC1. A PDCCH field of the macro base station is longer than that of the small base station, and consequently the PDCCH on the CC1 of the macro base station may generate strong interference to the PDCCH and a part of PDSCHs on the CC1 of the small base station. Using the cross-carrier scheduling method in the related technologies can only solve the problem of PDCCH interference between a macro base station and a small base station, and the ICIC mechanism in Release 8 is only applicable to the problem of interference between PDSCHs that can be dynamically scheduled. Therefore, the cross-carrier scheduling method in the related technologies cannot solve the problem of interference of the PDCCH of the macro base station to the PDSCH of the small base station.

SUMMARY

The present disclosure relates generally to communication technologies, and more specifically to a method and a device for controlling interference.

According to a first aspect of the embodiments of the present disclosure, there is provided a method for controlling interference. The method is applied in a macro base station, and the method includes:

dividing a control region of a time domain transmission unit to obtain a first power region and a second power region, wherein the control region is a region where control information is mapped onto a time domain and a frequency domain, and a transmission power of the first power region is higher than a transmission power of the second power region;

classifying all current channels to obtain a first channel group and a second channel group, wherein a channel quality of any channel in the first channel group is higher than a channel quality of any channel in the second channel group; and transmitting, by the first power region, data carried by all channels included in the second channel group, and transmitting, by the second power region, data carried by all channels included in the first channel group.

According to exemplary embodiments, the dividing a control region of a time domain transmission unit to obtain a first power region and a second power region includes:

determining a region in the control region of the time domain transmission unit that corresponds to a preset symbol position as the first power region; and determining a region exclusive of the first power region in the control region of the time domain transmission unit as the second power region.

According to exemplary embodiments, the method further includes:

transmitting the preset symbol position to a terminal via target signaling, wherein the target signaling includes any one of:

radio resource control signaling, system information, a media access control address control unit, and physical layer signaling.

According to exemplary embodiments, the preset symbol position is predefined in a communication protocol.

According to exemplary embodiments, the classifying all current channels to obtain a first channel group and a second channel group includes:

detecting signal-to-noise ratios for all the current channels;

selecting a preset number of channels in a descending order of the signal-to-noise ratios to obtain the first channel group; and classifying channels among all the current channels other than the channels included in the first channel group as the second channel group.

According to exemplary embodiments, the method further includes:

determining a ratio between the transmission power of the first power region and the transmission power of the second power region; and transmitting the ratio to a terminal, such that the terminal demodulates, from the time domain transmission unit transmitted from the macro base station to the terminal, a physical downlink control channel (PDCCH) according to the ratio and a reference signal.

According to exemplary embodiments, the transmitting the ratio to a terminal includes:

transmitting the ratio to the terminal via target signaling, wherein the target signaling includes any one of:

radio resource control signaling, system information, a media access control address control unit, and physical layer signaling.

According to a second aspect of the embodiments of the present disclosure, there is provided a device for controlling interference. The device is applied in a macro base station, and the device includes:

a region dividing module configured to divide a control region of a time domain transmission unit to obtain a first power region and a second power region, wherein the control region is a region where control information is mapped onto a time domain and a frequency domain, and a transmission power of the first power region is higher than a transmission power of the second power region;

a channel classification module configured to classify all current channels to obtain a first channel group and a second channel group, wherein a channel quality of any channel in the first channel group is higher than a channel quality of any channel in the second channel group; and an execution module configured to transmit, by the first power region, data carried by all channels included in the second channel group, and transmit, by the second power region, data carried by all channels included in the first channel group.

According to exemplary embodiments, the region dividing module includes:

a first region dividing submodule configured to determine a region in the control region of the time domain transmission unit that corresponds to a preset symbol position as the first power region; and a second region dividing submodule configured to determine a region exclusive of the first power region in the control region of the time domain transmission unit as the second power region.

According to exemplary embodiments, the device further includes:

a first transmitting module configured to transmit the preset symbol position to a terminal via target signaling, wherein the target signaling includes any one of:

radio resource control signaling, system information, a media access control address control unit, and physical layer signaling.

According to exemplary embodiments, the preset symbol position is predefined in a communication protocol.

According to exemplary embodiments, the channel classification module includes:

a detection module configured to detect signal-to-noise ratios for all the current channels;

a first channel classification submodule configured to select a preset number of channels in a descending order of the signal-to-noise ratios to obtain the first channel group; and a second channel classification submodule configured to classify channels among all the current channels other than the channels included in the first channel group as the second channel group.

According to exemplary embodiments, the device further includes:

a determination module configured to determine a ratio between the transmission power of the first power region and the transmission power of the second power region; and a second transmitting module configured to transmit the ratio to a terminal, such that the terminal demodulates, from the time domain transmission unit transmitted from the macro base station to the terminal, a physical downlink control channel (PDCCH) according to the ratio and a reference signal.

According to exemplary embodiments, the second transmitting module includes:

a transmitting submodule configured to transmit the ratio to the terminal via target signaling, wherein the target signaling includes any one of:

radio resource control signaling, system information, a media access control address control unit, and physical layer signaling.

According to a third aspect of the embodiments of the present disclosure, there is provided a computer-readable storage medium storing computer programs, wherein the computer programs are configured to perform the method for controlling interference according to the first aspect.

According to a fourth aspect of the embodiments of the present disclosure, there is provided a device for controlling interference. The device is applied in a macro base station, and the device includes:

a processor, and a memory configured to store instructions executable by the processor.

The processor is configured to:

divide a control region of a time domain transmission unit to obtain a first power region and a second power region, wherein the control region is a region where control information is mapped onto a time domain and a frequency domain, and a transmission power of the first power region is higher than a transmission power of the second power region;

classify all current channels to obtain a first channel group and a second channel group, wherein a channel quality of any channel in the first channel group is higher than a channel quality of any channel in the second channel group; and transmit, by the first power region, data carried by all channels included in the second channel group, and transmit, by the second power region, data carried by all channels included in the first channel group.

It is to be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this disclosure, illustrate embodiments conforming to the present disclosure and, together with the specification, serve to explain the principles of the present disclosure.

DETAILED DESCRIPTION

Reference will now be made in detail to exemplary embodiments, examples of which are illustrated in the accompanying drawings. When accompanying figures are mentioned in the following descriptions, the same numbers in different drawings represent the same or similar elements, unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

Terms used in the present disclosure are only for the purpose of description of specific embodiments, and are not intended to limit the present disclosure. As used in the present disclosure and appended claims, the singular forms "a/an," "said" and "the" intend to also include the plural form, unless the content clearly dictates otherwise. It should also be understood that the term "and/or" used herein means to include arbitrary and all possible combinations of one or more items listed in association.

It should be understood that terms such as "first," "second," "third" and the like may be used herein for description of information. However, the information shall not be restricted to these terms. These terms are only intended to distinguish among information of the same type. For example, under the circumstance of not departing from the scope of the present disclosure, first information can also be referred to as second information, similarly, second information can also be referred to as first information. Depending on the context, term "if" used herein can be interpreted as "when," "while" or "in response to determining . . . ."

Figure 1:
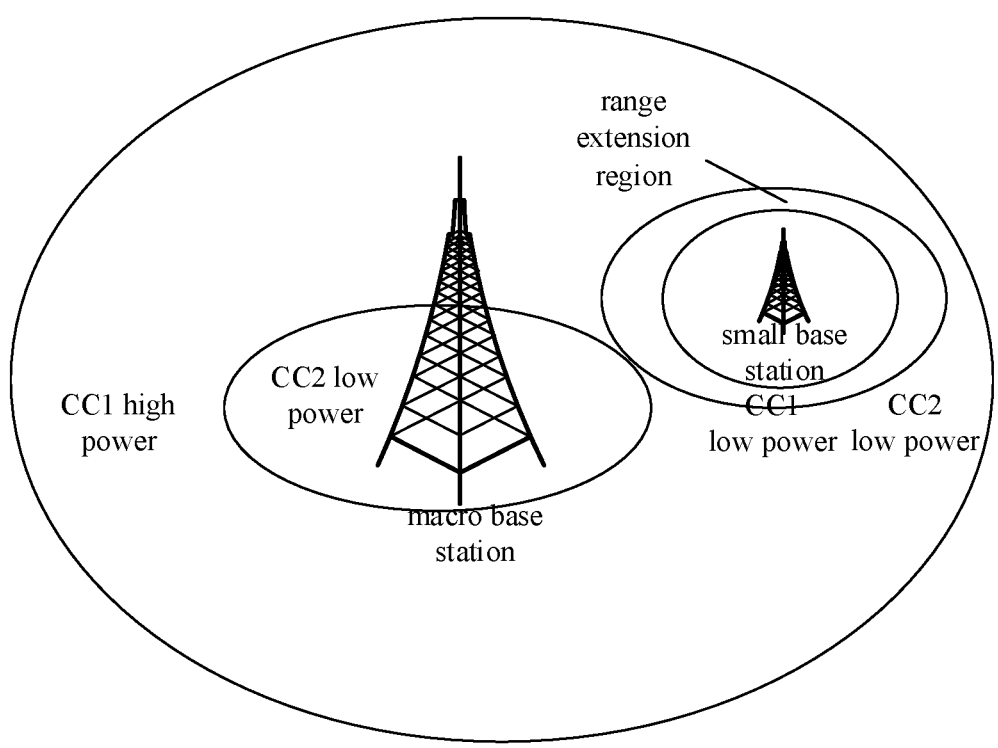
FIG. 1 is a schematic scenario diagram of a heterogeneous network according to related technologies.
Figure 2A:
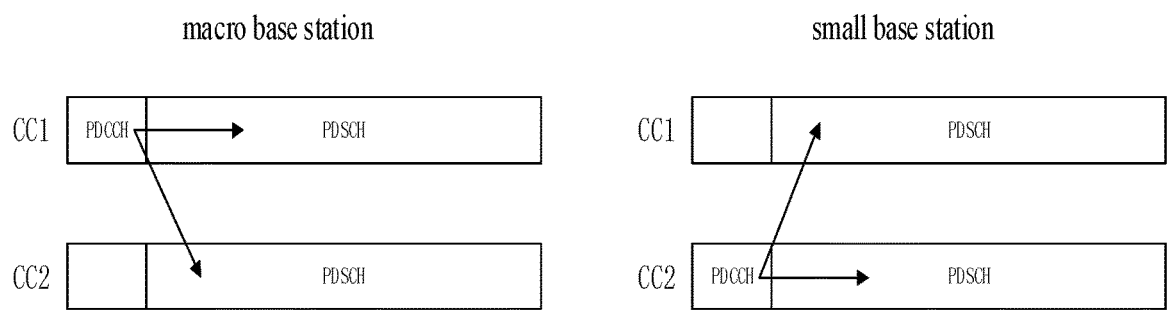
FIG. 2A is a first schematic scenario diagram of interference generated by the heterogeneous network according to the related technologies.
Figure 2B:
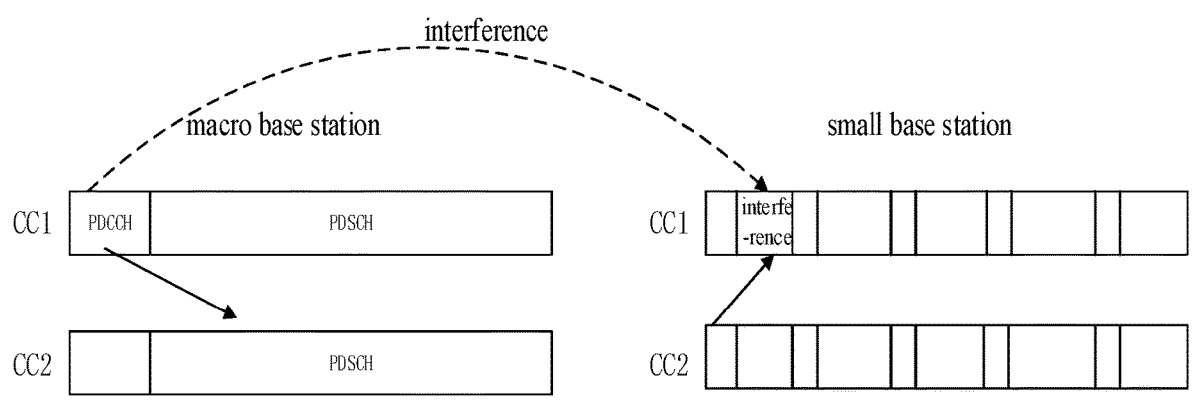
FIG. 2B is a second schematic scenario diagram of interference generated by the heterogeneous network according to the related technologies.

In the heterogeneous network as shown in FIG. 1, a macro base station and a small base station share two downlink carrier components (CCs). When performing cross-carrier scheduling, the macro base station may use the CC1 to perform cross-carrier scheduling of data transmitted on the CC2, and the small base station uses the PDCCH of the CC2 to perform cross-carrier scheduling of data on the CC2, as shown in FIG. 2A. The macro base station and the small base station have different numerologies, which may cause interference of the PDCCH of the macro base station to the PDCCH and a part of PDSCHs of the small base station, as shown in FIG. 2B.

In the related technologies, a position of an interfered time domain resource on the small base station may be punctured, such that the small base station discards signals received on the corresponding time domain and frequency domain resources. However, this method may cause fragmentization of the time domain and frequency domain resources and may reduce spectrum utilization.

In order to solve the problem of interference to a PDSCH of a small base station caused by a PDCCH of a macro base station when a subcarrier spacing configured for the macro base station on the same carrier is smaller than a subcarrier spacing on the small base station in a heterogeneous network, embodiments of the present disclosure provide a method and a device for controlling interference as below.

In the embodiments of the present disclosure, the method and the device for controlling interference may be based on the following conditions. First, in the heterogeneous network, the problem of interference to the PDSCH of the small base station caused by the PDCCH of the macro base station is solved by cross-carrier scheduling. In addition, in NR, a base station supports adoption of different transmission powers on different OFDM symbols.

Figure 3:
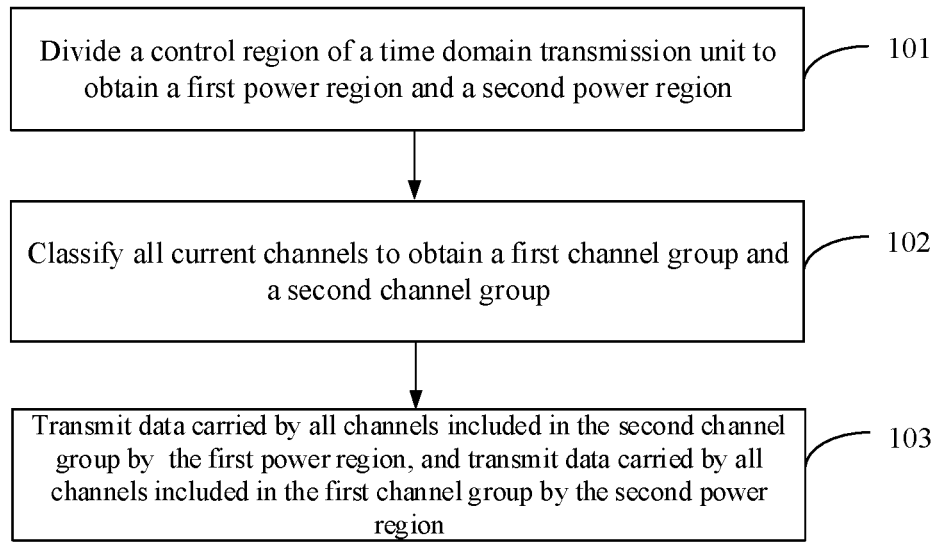
FIG. 3 illustrates a flowchart of a method for controlling interference according to some embodiments.
Figure 4:
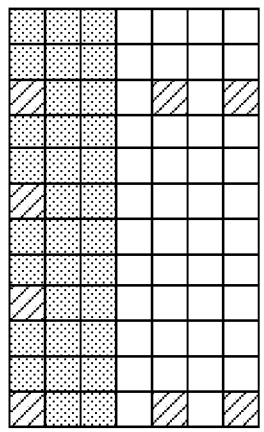
FIG. 4 illustrates a schematic scenario diagram of controlling interference according to some embodiments.

As shown in FIG. 3, a flowchart of a method for controlling interference is illustrated according to some embodiments. The method may be applied in a macro base station and may include following steps.

In Step 101, a control region of a time domain transmission unit is divided to obtain a first power region and a second power region. The control region is a region where control information is mapped onto a time domain and a frequency domain, and a transmission power of the first power region is higher than that of the second power region.

In Step 102, all current channels are classified to obtain a first channel group and a second channel group. A channel quality of any channel in the first channel group is higher than a channel quality of any channel in the second channel group.

In Step 103, data carried by all channels included in the second channel group are transmitted by the first power region, and data carried by all channels included in the first channel group are transmitted by the second power region.

In the foregoing embodiment, in a heterogeneous network, the macro base station may divide the control region of the time domain transmission unit to obtain the first power region and the second power region. The transmission power of the first power region may be higher than that of the second power region. The macro base station may also classify all current channels to obtain a first channel group having a high channel quality and a second channel group having a poor channel quality. Further, the macro base station may transmit data carried by all channels included in the second channel group by the first power region, and transmit data carried by all channels included in the first channel group by the second power region. In the above procedures, the macro base station transmits the data carried by all the channels included in the second channel group having a poorer channel quality by the first power region with a high transmission power, and transmits the data carried by all the channels included in the first channel group having a high channel quality by the second power region with a low transmission power, which may greatly reduce interference to a PDSCH of a small base station caused by a PDCCH of a macro base station when the macro base station and the small base station use different numerologies on the same carrier in a heterogeneous network, without reducing the spectrum utilization rates of the macro base station and the small base station.

For the above Step 101, the time domain transmission unit may be a subframe or a slot, etc., and the macro base station may divide the control region of the time domain transmission unit to obtain different power regions. The control region is a region where control information is mapped in the time domain and the frequency domain. The control information may be a PDCCH, a paging indicator channel (PICH), or the like.

Figure 5:
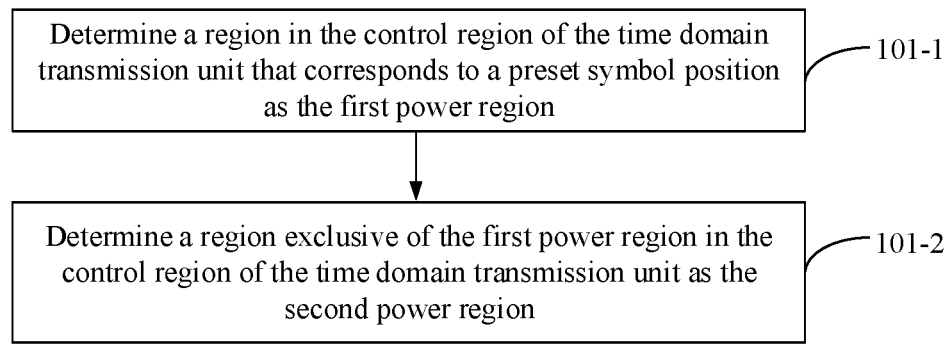
FIG. 5 illustrates a flowchart of another method for controlling interference according to some embodiments.

Details regarding Step 101 may be found in FIG. 5. FIG. 5 illustrates a flowchart of another method for controlling interference according to an embodiment. On the basis of FIG. 3, the method may include following steps.

In Step 101-1, a region in the control region of the time domain transmission unit that corresponds to a preset symbol position is determined as the first power region.

Figure 6A:
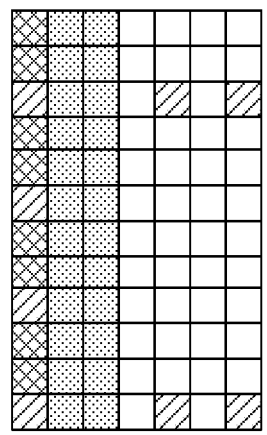
FIG. 6A illustrate a first schematic scenario diagram of controlling interference according to some embodiments.

In this step, the base station may determine the region in the control region of the time domain transmission unit that corresponds to the preset symbol position as the first power region. For example, if the preset symbol position is the position where a first time domain symbol is located, the base station may determine the region corresponding to the first time domain symbol as the first power region, as shown in FIG. 6A.

The preset symbol position may be preset by the base station. Further, the macro base station may transmit the preset symbol position to the terminal through target signaling. According to exemplary embodiments, the target signaling may be any one of radio resource control signaling, system information, a media access control address control unit, and physical layer signaling.

According to exemplary embodiments, the preset symbol position may be predefined in a communication protocol. In this case, the base station does not transmit the preset symbol position to the terminal through signaling. Instead, the terminal may directly determine the preset symbol position based on contents stipulated in the communication protocol.

After the preset symbol position is obtained, the terminal may learn power regions of different transmission powers used by the macro base station in the control region of the time domain transmission unit, and demodulate the PDCCH according to a reference signal and a ratio between power values of different power regions.

In the above embodiments, the preset symbol position may be preset by the macro base station and transmitted to the terminal by the macro base station via the target signaling; or the preset symbol position may be predefined in the communication protocol. The terminal may receive the preset symbol position transmitted by the macro base station through the target signaling or may directly acquire the preset symbol position based on the communication protocol, so as to determine power regions of different transmission powers used by the macro base station in the control region of the time domain transmission unit, and demodulate the PDCCH according to a reference signal and a ratio between power values of different power regions.

In Step 101-2, a region exclusive of the first power region in the control region of the time domain transmission unit is determined as the second power region.

Figure 6B:
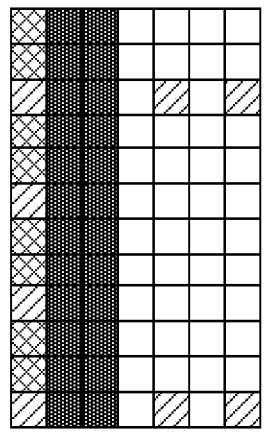
FIG. 6B illustrate a second schematic scenario diagram of controlling interference according to some embodiments.

In this step, the base station may determine a region other than the first power region in the control region of the time domain transmission unit as the second power region. For example, in FIG. 6A, after the region corresponding to the first time domain symbol is determined as the first power region, the remaining control region is determined as the second power region, as shown in FIG. 6B.

Through the above procedures, the macro base station may quickly divide different power regions, so as to transmit data carried by all channels included in different channel groups by different power regions subsequently.

For the foregoing Step 102, after obtaining different power regions, the base station may further divide all the current channels into the first channel group and the second channel group according to channel quality.

Figure 7:
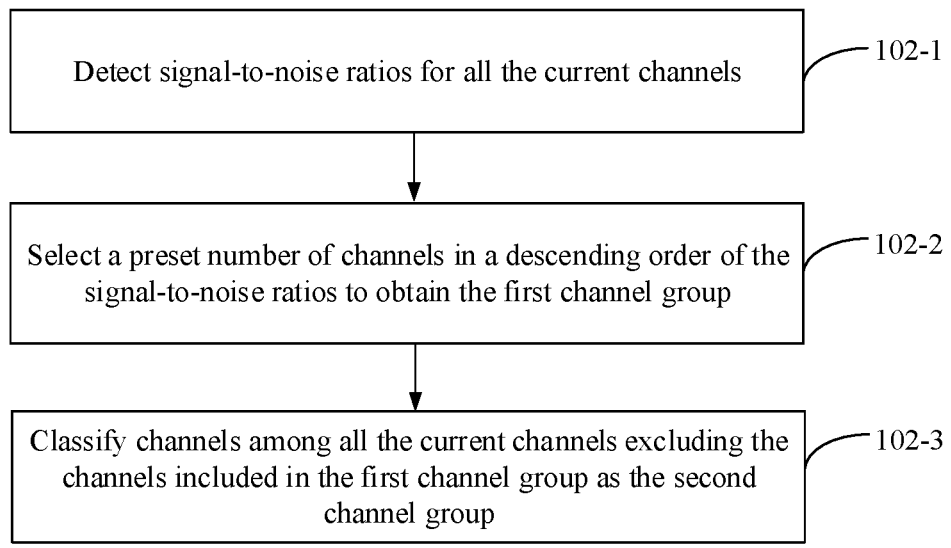
FIG. 7 illustrates a flowchart of still another method for controlling interference according to some embodiments.

Details regarding Step 102 may be found in FIG. 7. FIG. 7 illustrates a flowchart of another method for controlling interference according to an embodiment. On the basis of FIG. 3, this method may include following steps.

In Step 102-1, signal-to-noise ratios for all the current channels are detected.

In this step, the base station may detect signal-to-noise ratios for all the current channels according to related technologies.

In Step 102-2, a preset number of channels are selected in a descending order of the signal-to-noise ratios to obtain the first channel group.

In this step, the base station may divide a preset number of high ranked channels among the channels ranked in a descending order of signal-to-noise ratios into the first channel group. That is, a plurality of channels having good channel quality are classified into the first channel group.

In Step 102-3, channels among all the current channels other than the channels included in the first channel group are classified into the second channel group.

In this step, after the base station obtains the first channel group, those channels not belonging to the first channel group are automatically divided into the second channel group.

For the foregoing Step 103, the base station may use the first power region having a high transmission power to transmit data carried by all channels included in the second channel group having poor channel quality, and use the second power region having a low transmission power to transmit data carried by all channels included in the first channel group having good channel quality.

Figure 8:
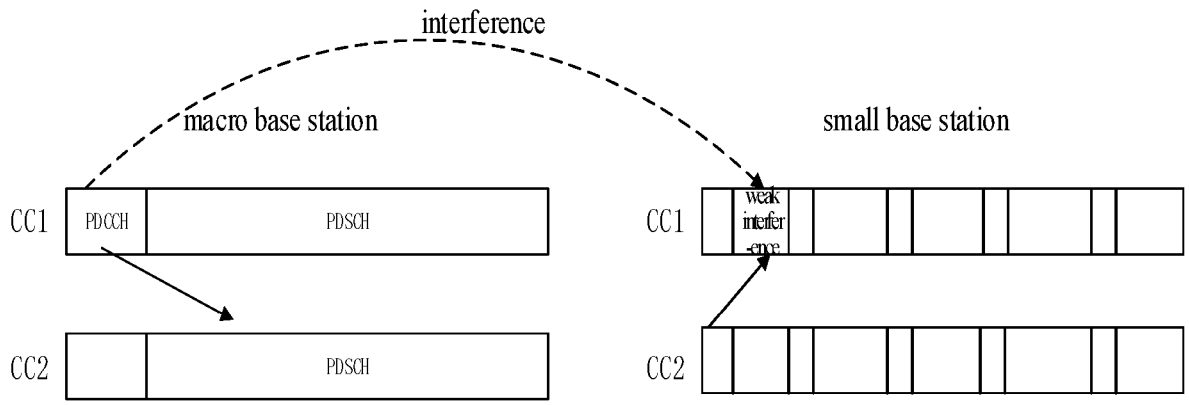
FIG. 8 illustrates a schematic scenario diagram of controlling interference according to some embodiments.

Through the above procedures, the present disclosure may greatly reduce interference to a PDSCH of a small base station caused by a PDCCH of a macro base station when the macro base station and the small base station use different numerologies on the same carrier in a heterogeneous network, as shown in FIG. 8.

The macro base station may divide all the current channels according to signal-to-noise ratios. For example, the macro base station may divide channels having good channel quality (i.e., channels having a high signal-to-noise ratio) into the first channel group, and divide channels having poor channel quality (i.e., channels having a low signal-to-noise ratio) into the second channel group. The macro base station may transmit data carried by all channels included in different channel groups having different channel qualities by different power regions subsequently. In this way, the present disclosure may greatly reduce interference to a PDSCH of a small base station caused by a PDCCH of the macro base station when the macro base station and the small base station use different numerologies on the same carrier in a heterogeneous network, without reducing the spectrum utilization rates of the macro base station and the small base station.

Figure 9:
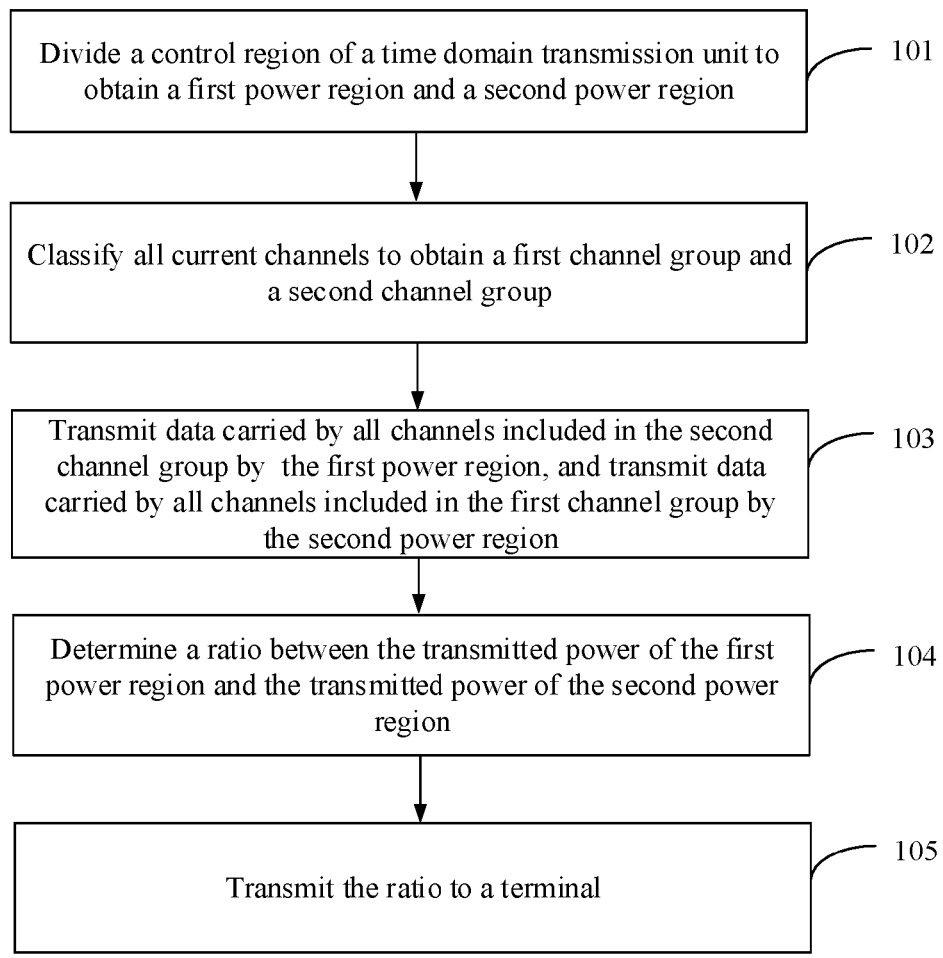
FIG. 9 illustrates a flowchart of still another method for controlling interference according to some embodiments.

In some embodiments, in order to allow the terminal to demodulate a PDCCH from the time domain transmission unit transmitted from the macro base station to the terminal, the method shown in FIG. 9 is provided. FIG. 9 is a flowchart of another method for controlling interference according to an embodiment. On the basis of FIG. 3, the method for controlling interference may further include following steps.

In Step 104, a ratio between the transmission power of the first power region and the transmission power of the second power region is determined.

In this step, the base station may calculate a ratio between power values of different power regions, for example, α.

In Step 105, the ratio is transmitted to a terminal, such that the terminal demodulates, from the time domain transmission unit transmitted from the macro base station to the terminal, a physical downlink control channel (PDCCH) according to the ratio and a reference signal.

In this step, the base station may transmit the ratio α to the terminal through the target signaling. After receiving the ratio α, the terminal may calculate transmission powers corresponding to different power regions. Further, the terminal may demodulate, from the time domain transmission unit transmitted from the macro base station to the terminal, the PDCCH based on a reference signal and the transmission powers corresponding to different power regions. In this way, the terminal can successfully demodulate a PDCCH while reducing interference to a PDSCH of a small base station caused by a PDCCH of a macro base station. The embodiments of the present disclosure can avoid reduction of the spectrum utilization rates of the macro base station and the small base station, and do not have a negative effect on normal services of the terminal.

In the embodiments of the present disclosure, the target signaling may be any one of radio resource control signaling, system information, a media access control address control unit, and physical layer signaling.

The ratio α may be predefined as a fixed value in a communication protocol. In this case, the base station does not need to transmit the ratio to the terminal. Instead, the terminal may directly demodulate the PDCCH according to the ratio stipulated in the communication protocol and the reference signal.

It should be explained that, for a brief description, the foregoing method embodiments are described as a combination of a series of operations. However, those skilled in the art should know that the present disclosure is not limited by sequences of the operations described. This is because some steps may be performed according to other sequences or be performed simultaneously in accordance with the present disclosure.

In addition, those skilled in the art should understand that the embodiments described in the specification are exemplary embodiments, and involved operations and modules are not necessary for some embodiments of the present disclosure.

Corresponding to the foregoing method embodiments, the present disclosure also provides device embodiments for implementing corresponding functions.

Figure 10:
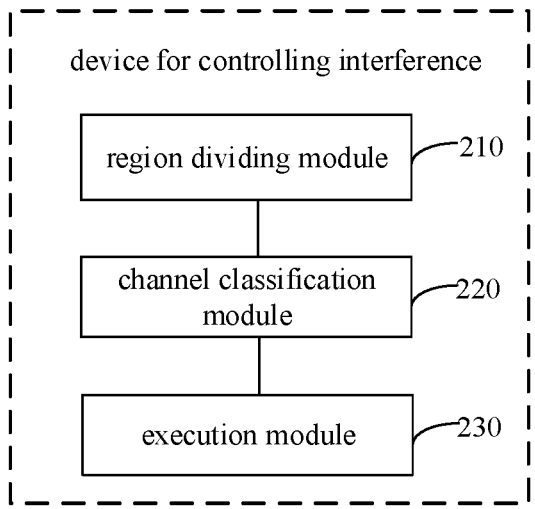
FIG. 10 illustrates a block diagram of a device for controlling interference according to some embodiments.

FIG. 10 illustrates a block diagram of a device for controlling interference according to some embodiments. As shown in FIG. 10, the device is applied in a macro base station, and the device includes a region dividing module 210, a channel classification module 220 and an execution module 230.

The region dividing module 210 is configured to divide a control region of a time domain transmission unit to obtain a first power region and a second power region, wherein the control region is a region where control information is mapped onto a time domain and a frequency domain, and a transmission power of the first power region is higher than that of the second power region.

The channel classification module 220 is configured to classify all current channels to obtain a first channel group and a second channel group, wherein a channel quality of any channel in the first channel group is higher than a channel quality of any channel in the second channel group.

The execution module 230 is configured to transmit data carried by all channels included in the second channel group by the first power region, and transmit data carried by all channels included in the first channel group by the second power region.

The macro base station uses the first power region having a high transmission power to transmit the data carried by all the channels included in the second channel group having a poor channel quality, and uses the second power region having a low transmission power to transmit the data carried by all the channels included in the first channel group having a high channel quality. In this way, embodiments of the present disclosure may greatly reduce interference to a PDSCH of a small base station caused by a PDCCH of a macro base station, when the macro base station and the small base station use different numerologies on the same carrier in a heterogeneous network, without reducing the spectrum utilization rates of the macro base station and the small base station.

Figure 11:
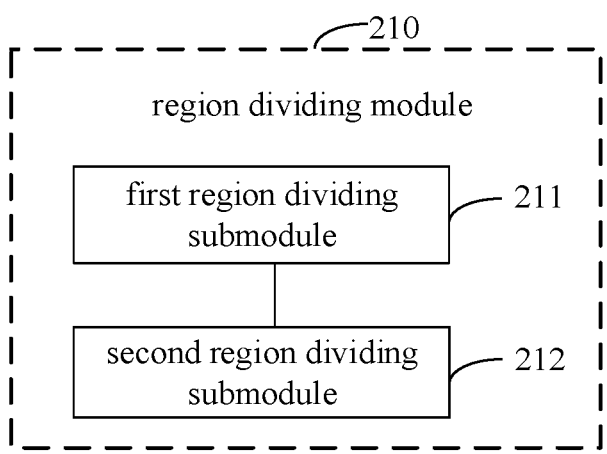
FIG. 11 illustrates a block diagram of another device for controlling interference according to some embodiments.

FIG. 11 is a block diagram of another device for controlling interference according to an embodiment. On the basis of FIG. 10, the region dividing module 210 includes a first region classification submodule 211 and a second region classification submodule 212.

The first region classification submodule 211 is configured to determine a region in the control region of the time domain transmission unit that corresponds to a preset symbol position as the first power region.

The second region classification submodule 212 is configured to determine a region exclusive of the first power region in the control region of the time domain transmission unit as the second power region.

The macro base station may quickly divide different power regions, so as to transmit data carried by all channels included in different channel groups by different power regions subsequently.

Figure 12:
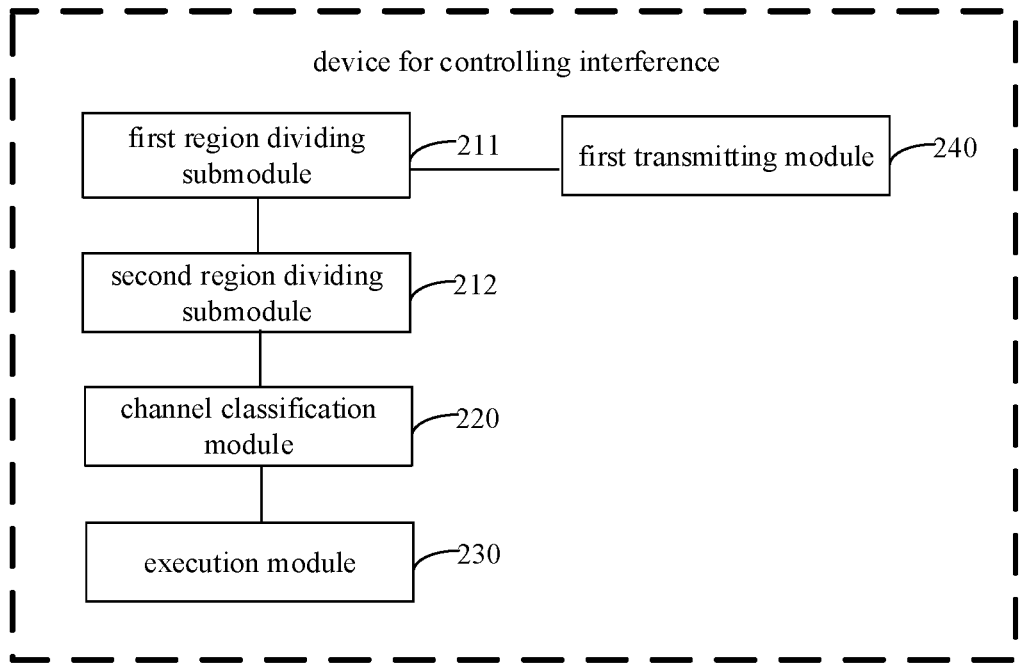
FIG. 12 illustrates a block diagram of still another device for controlling interference according to some embodiments.

FIG. 12 is a block diagram of another device for controlling interference according to an embodiment. On the basis of FIG. 11, the device further includes a first transmitting module 240.

The first transmitting module 240 is configured to transmit the preset symbol position to the terminal via target signaling, wherein the target signaling includes any one of:

radio resource control signaling, system information, a media access control address control unit, and physical layer signaling.

According to exemplary embodiments, the preset symbol position is predefined in a communication protocol.

Figure 13:
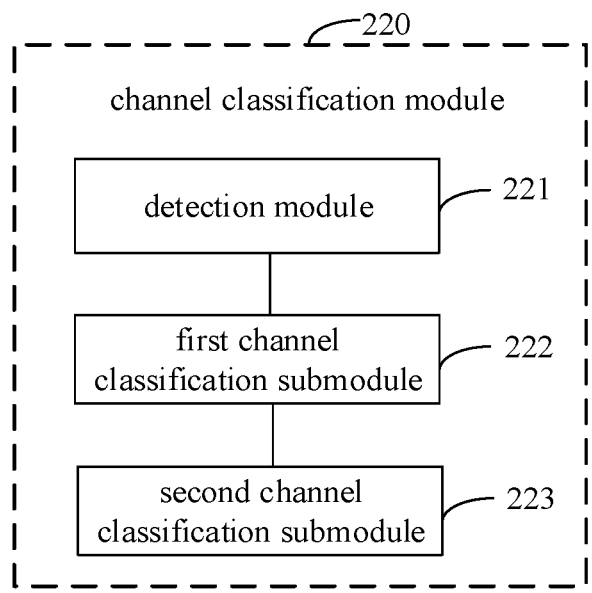
FIG. 13 illustrates a block diagram of still another device for controlling interference according to some embodiments.

The preset symbol position may be preset by the macro base station and transmitted to the terminal by the macro base station via the target signaling; or the preset symbol position may be predefined in the communication protocol. The terminal may receive the preset symbol position transmitted by the macro base station through the target signaling or may directly acquire the preset symbol position through the communication protocol, so as to determine power regions of different transmission powers used by the macro base station in the control region of the time domain transmission unit, and demodulate the PDCCH according to a reference signal and a ratio between power values of different power regions. FIG. 13 is a block diagram of another device for controlling interference according to an embodiment. On the basis of FIG. 10, the channel classification module 220 includes a detection module 221, a first channel classification submodule 222 and a second channel classification submodule 223.

The detection module 221 is configured to detect signal-to-noise ratios for all the current channels.

The first channel classification submodule 222 is configured to select a preset number of channels in a descending order of the signal-to-noise ratios to obtain the first channel group.

The second channel classification submodule 223 is configured to classify channels among all the current channels other than the channels included in the first channel group into the second channel group.

The macro base station may divide all the current channels according to signal-to-noise ratios. For example, the macro base station may divide channels having good channel quality (i.e., channels having a high signal-to-noise ratio) into the first channel group, and divide channels having poor channel quality (i.e., channels having a low signal-to-noise ratio) into the second channel group. The macro base station may transmit data carried by all channels included in different channel groups having different channel qualities by different power regions subsequently, which may greatly reduce interference to a PDSCH of a small base station caused a PDCCH of the macro base station when the macro base station and the small base station use different numerologies on the same carrier in a heterogeneous network, without reducing the spectrum utilization rates of the macro base station and the small base station.

Figure 14:
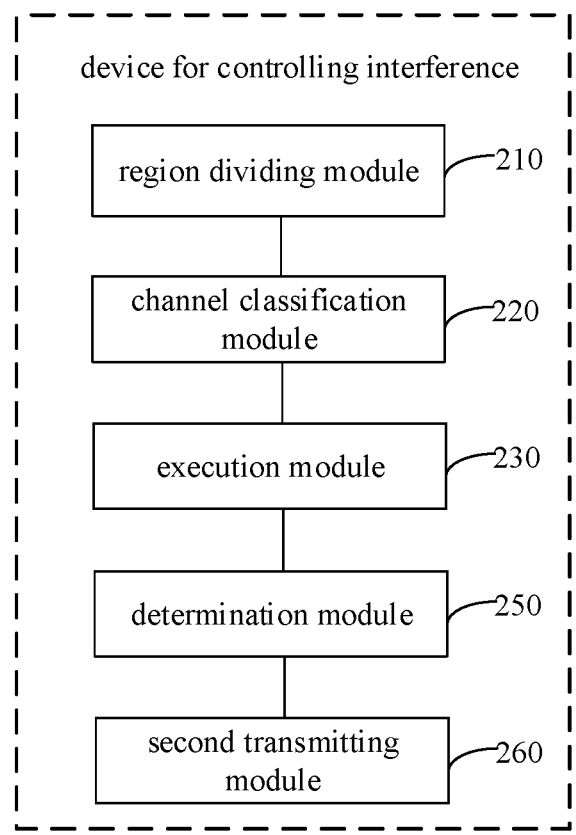
FIG. 14 illustrates a block diagram of still another device for controlling interference according to some embodiments.

FIG. 14 is a block diagram of another device for controlling interference according to an embodiment. On the basis of FIG. 10, the device further includes a determination module 250 and a second transmitting module 260.

The determination module 250 is configured to determine a ratio between the transmission power of the first power region and the transmission power of the second power region.

The second transmitting module 260 is configured to transmit the ratio to a terminal, such that the terminal demodulates, from the time domain transmission unit transmitted from the macro base station to the terminal, a physical downlink control channel (PDCCH) according to the ratio and a reference signal.

Figure 15:
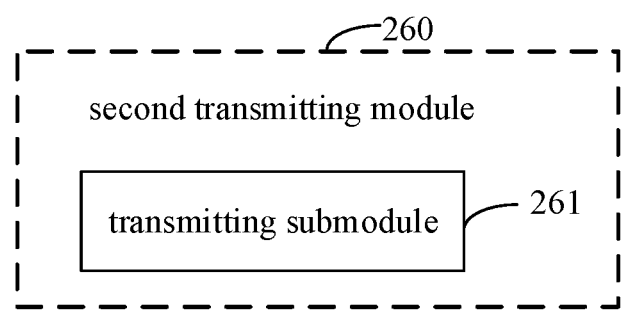
FIG. 15 illustrates a block diagram of still another device for controlling interference according to some embodiments.

FIG. 15 is a block diagram of another device for controlling interference according to an embodiment. On the basis of FIG. 14, the second transmitting module 260 includes a transmitting submodule 261.

The transmitting submodule 261 is configured to transmit the ratio to the terminal via target signaling, wherein the target signaling includes any one of:

radio resource control signaling, system information, a media access control address control unit, and physical layer signaling.

The macro base station may transmit a ratio between the transmission power of the first power region and the transmission power of the second power region to the terminal. According to exemplary embodiments, the macro base station may transmit the ratio to the terminal via the target signaling. After receiving the ratio, the terminal may demodulate, from the time domain transmission unit transmitted from the macro base station to the terminal, a PDCCH according to the ratio and a reference signal. In this way, the terminal can successfully demodulate a PDCCH while reducing interference to a PDSCH of a small base station caused by a PDCCH of a macro base station. Accordingly, embodiments of the present disclosure can avoid reduction of the spectrum utilization rates of the macro base station and the small base station, and do not have a negative effect on normal services of the terminal.

Device embodiments are basically corresponding to the method embodiments, and details regarding the device embodiments can be found in the previous description regarding the method embodiments. The device embodiments set forth above are merely exemplary, units described as separate parts can be or not be separated physically; parts displayed as units can be or not be physical units, i.e., the parts may be located at the same place, or may be distributed on a plurality of network units. Modules can be selected in part or in whole according to the actual needs for realization of solutions of the present disclosure, and those of ordinary skill in this art can understand and implement the embodiments.

The present disclosure also provides a computer-readable storage medium storing computer program. The computer programs are configured to perform the method for controlling interference according to any one of the above embodiments.

The present disclosure also provides a device for controlling interference. The device is applied in a macro base station, and the device includes:

a processor, and a memory configured to store instructions executable by the processor.

The processor is configured to:

divide a control region of a time domain transmission unit to obtain a first power region and a second power region, the control region being a region where control information is mapped onto a time domain and a frequency domain, and a transmission power of the first power region being higher than that of the second power region;

classify all current channels to obtain a first channel group and a second channel group, wherein a channel quality of any channel in the first channel group is higher than a channel quality of any channel in the second channel group; and transmit, by the first power region, data carried by all channels comprised in the second channel group, and transmit, by the second power region, data carried by all channels comprised in the first channel group.

Figure 16:
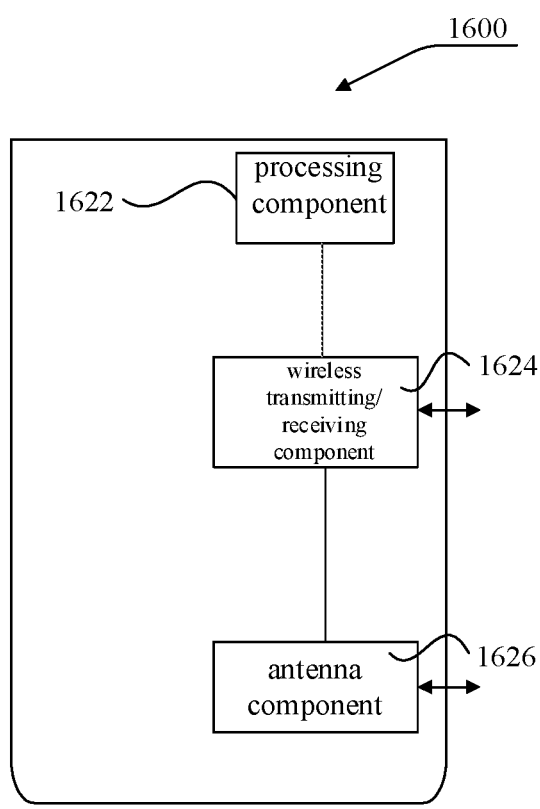
FIG. 16 illustrates a schematic structural diagram of a device for controlling interference according to an exemplary example of the present disclosure.

As shown in FIG. 16, a schematic structural diagram of a device 1600 for feeding back a hybrid automatic repeat request result is illustrated according to some embodiments. The device 1600 may be provided as a macro base station. Referring to FIG. 16, the device 1600 includes a processing component 1622, a wireless transmitting/receiving component 1624, an antenna component 1626, and a signal processing portion peculiar to a wireless interface. The processing component 1622 may further include one or more processors.

One processor of the processing component 1622 may be configured to:

divide a control region of a time domain transmission unit to obtain a first power region and a second power region, the control region being a region where control information is mapped onto a time domain and a frequency domain, and a transmission power of the first power region being higher than that of the second power region;

classify all current channels to obtain a first channel group and a second channel group, wherein a channel quality of any channel in the first channel group is higher than a channel quality of any channel in the second channel group; and transmit, by the first power region, data carried by all channels comprised in the second channel group, and transmit, by the second power region, data carried by all channels comprised in the first channel group.

Various embodiments of the present disclosure can have one or more of the following advantages.

In the embodiments of the present disclosure, in a heterogeneous network, the macro base station may divide the control region of the time domain transmission unit to obtain the first power region and the second power region. The transmission power of the first power region may be higher than the transmission power of the second power region. The macro base station may also classify all current channels to obtain a first channel group having a high channel quality and a second channel group having a poor channel quality. Further, the macro base station may use the first power region to transmit data carried by all channels included in the second channel group, and use the second power region to transmit data carried by all channels included in the first channel group. In the above procedures, the macro base station transmits the data carried by all the channels included in the second channel group which has a poor channel quality by the first power region which has a high transmission power, and transmits the data carried by all the channels included in the first channel group which has a high channel quality by the second power region which has a low transmission power, which may greatly reduce interference of a PDCCH of a macro base station on a PDSCH of a small base station when the macro base station and the small base station use different numerologies on the same carrier in a heterogeneous network, without reducing the spectrum utilization rates of the macro base station and the small base station.

In the embodiments of the present disclosure, when dividing different power regions, the macro base station may determine a region in the control region of the time domain transmission unit that corresponds to a preset symbol position as the first power region, and determine a region exclusive of the first power region in the control region as the second power region. Through the above procedures, the macro base station may quickly divide different power regions, so as to transmit data carried by all channels included in different channel groups by different power regions subsequently.

In the embodiments of the present disclosure, the preset symbol position may be preset by the macro base station and transmitted to a terminal by the macro base station via target signaling; or the preset symbol position may be predefined in a communication protocol. The terminal may receive the preset symbol position transmitted by the macro base station through the target signaling or may directly acquire the preset symbol position through the communication protocol, so as to determine power regions of different transmission powers used by the macro base station in the control region of the time domain transmission unit, and demodulate, from the time domain transmission unit, a PDCCH according to a reference signal and a ratio between power values of different power regions.

In the embodiments of the present disclosure, the macro base station may divide all the current channels according to signal-to-noise ratios. For example, the macro base station may divide channels having good channel quality (i.e., channels having a high signal-to-noise ratio) into the first channel group, and divide channels having poor channel quality (i.e., channels having a low signal-to-noise ratio) into the second channel group. The macro base station may transmit data carried by all channels included in different channel groups having different channel qualities by different power regions, which may greatly reduce interference of a PDCCH of the macro base station on a PDSCH of a small base station when the macro base station and the small base station use different numerologies on the same carrier in a heterogeneous network, without reducing the spectrum utilization rates of the macro base station and the small base station.

In the embodiments of the present disclosure, the macro base station may transmit a ratio between the transmission power of the first power region and the transmission power of the second power region to a terminal. According to exemplary embodiments, the macro base station may transmit the ratio to the terminal via target signaling. After receiving the ratio, the terminal may demodulate, from the time domain transmission unit transmitted from the macro base station to the terminal, a PDCCH according to the ratio and a reference signal. In this way, the terminal can successfully demodulate a PDCCH while reducing interference of a PDCCH of a macro base station on a PDSCH of a small base station. Accordingly, embodiments of the present disclosure can avoid reduction of the spectrum utilization rates of the macro base station and the small base station, and do not have a negative effect on normal services of the terminal.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for controlling interference, wherein the method is performed by a macro base station, and comprises:

dividing a control region of a time domain transmission unit to obtain a first power region and a second power region, wherein the control region is a region where control information is mapped onto a time domain and a frequency domain, and a transmission power of the first power region is higher than a transmission power of the second power region;

classifying all current channels to obtain a first channel group and a second channel group, wherein a channel quality of any channel in the first channel group is higher than a channel quality of any channel in the second channel group;

transmitting, by the first power region, data carried by all channels included in the second channel group, and transmitting, by the second power region, data carried by all channels included in the first channel group;

determining a ratio between the transmission power of the first power region and the transmission power of the second power region; and transmitting the ratio to a terminal, such that the terminal demodulates, from the time domain transmission unit transmitted from the macro base station to the terminal, a physical downlink control channel (PDCCH) according to the ratio and a reference signal.

2. The method according to claim 1, wherein the dividing a control region of a time domain transmission unit to obtain a first power region and a second power region comprises:

determining a region in the control region of the time domain transmission unit that corresponds to a preset symbol position as the first power region; and determining a region exclusive of the first power region in the control region of the time domain transmission unit as the second power region.

3. The method according to claim 2, further comprising:

transmitting the preset symbol position to a terminal via target signaling, the target signaling comprising any one of:

radio resource control signaling, system information, a media access control address control unit, and physical layer signaling.

4. The method according to claim 2, wherein the preset symbol position is predefined in a communication protocol.

5. The method according to claim 1, wherein the classifying all current channels to obtain a first channel group and a second channel group comprises:

detecting signal-to-noise ratios for all the current channels;

selecting a preset number of channels in a descending order of the signal-to-noise ratios to obtain the first channel group; and classifying channels among all the current channels other than the channels comprised in the first channel group as the second channel group.

6. The method according to claim 1, wherein the transmitting the ratio to a terminal comprises:

transmitting the ratio to the terminal via target signaling, the target signaling comprising any one of:

radio resource control signaling, system information, a media access control address control unit, and physical layer signaling.

7. A device for controlling interference, comprising:

a processor, and a memory configured to store instructions executable by the processor;

wherein the processor is configured to:

divide a control region of a time domain transmission unit to obtain a first power region and a second power region, wherein the control region is a region where control information is mapped onto a time domain and a frequency domain, and a transmission power of the first power region is higher than that of the second power region;

classify all current channels to obtain a first channel group and a second channel group, wherein a channel quality of any channel in the first channel group is higher than a channel quality of any channel in the second channel group; and transmit, by the first power region, data carried by all channels comprised in the second channel group, and transmit, by the second power region, data carried by all channels comprised in the first channel group;

wherein the processor is further configured to:

determine a ratio between the transmission power of the first power region and the transmission power of the second power region; and transmit the ratio to a terminal, such that the terminal demodulates, from the time domain transmission unit transmitted from a macro base station to the terminal, a physical downlink control channel (PDCCH) according to the ratio and a reference signal.

8. The device according to claim 7, wherein the processor is configured to:

determine a region in the control region of the time domain transmission unit that corresponds to a preset symbol position as the first power region; and determine a region exclusive of the first power region in the control region of the time domain transmission unit as the second power region.

9. The device according to claim 8, wherein the processor is further configured to:

transmit the preset symbol position to the terminal via target signaling, the target signaling comprising any one of:

radio resource control signaling, system information, a media access control address control unit, and physical layer signaling.

10. The device according to claim 8, wherein the preset symbol position is predefined in a communication protocol.

11. The device according to claim 7, wherein the processor is configured to:

detect signal-to-noise ratios for all the current channels;

select a preset number of channels in a descending order of the signal-to-noise ratios to obtain the first channel group; and classify channels among all the current channels other than the channels comprised in the first channel group as the second channel group.

12. The device according to claim 7, wherein the processor is further configured to:

transmit the ratio to the terminal via target signaling, the target signaling comprising any one of:

radio resource control signaling, system information, a media access control address control unit, and physical layer signaling.

13. A non-transitory computer-readable storage medium comprising instructions which, when executed by a processor in a macro base station, causes the processor to:

divide a control region of a time domain transmission unit to obtain a first power region and a second power region, wherein the control region is a region where control information is mapped onto a time domain and a frequency domain, and a transmission power of the first power region is higher than a transmission power of the second power region;

classify all current channels to obtain a first channel group and a second channel group, wherein a channel quality of any channel in the first channel group is higher than a channel quality of any channel in the second channel group; and transmit, by the first power region, data carried by all channels comprised in the second channel group, transmit, by the second power region, data carried by all channels comprised in the first channel group;

determine a ratio between the transmission power of the first power region and the transmission power of the second power region; and transmit the ratio to a terminal, such that the terminal demodulates, from the time domain transmission unit transmitted from the macro base station to the terminal, a physical downlink control channel (PDCCH) according to the ratio and a reference signal.

14. The non-transitory computer-readable storage medium according to claim 13, wherein the instructions further cause the processor to:
determine a region in the control region of the time domain transmission unit that corresponds to a preset symbol position as the first power region; and
determine a region exclusive of the first power region in the control region of the time domain transmission unit as the second power region.

15. The non-transitory computer-readable storage medium according to claim 14, wherein the instructions further cause the processor to:
transmit the preset symbol position to the terminal via target signaling, the target signaling comprising any one of:
radio resource control signaling,
system information,
a media access control address control unit, and
physical layer signaling.

16. The non-transitory computer-readable storage medium according to claim 14, wherein
the preset symbol position is predefined in a communication protocol; and
the classifying all current channels to obtain a first channel group and a second channel group comprises:
detecting signal-to-noise ratios for all the current channels;
selecting a preset number of channels in a descending order of the signal-to-noise ratios to obtain the first channel group; and
classifying channels among all the current channels other than the channels comprised in the first channel group as the second channel group.

17. A communication system implementing a method for controlling interference, the method comprising:
dividing a control region of a time domain transmission unit to obtain a first power region and a second power region, wherein the control region is a region where control information is mapped onto a time domain and a frequency domain, and a transmission power of the first power region is higher than a transmission power of the second power region;
classifying all current channels to obtain a first channel group and a second channel group, wherein a channel quality of any channel in the first channel group is higher than a channel quality of any channel in the second channel group; and
transmitting, by the first power region, data carried by all channels included in the second channel group, and transmitting, by the second power region, data carried by all channels included in the first channel group, the communication system comprising a macro base station and a terminal, wherein
the macro base station is configured to divide, in a heterogeneous network, the control region of the time domain transmission unit to obtain the first power region and the second power region;
transmit the data carried by all the channels included in the second channel group that has a poor channel quality by the first power region that has a high transmission power;
transmit the data carried by all the channels included in the first channel group that has a high channel quality by the second power region that has a low transmission power, thereby reducing interference of a physical downlink control channel (PDCCH) of the macro base station on a physical downlink shared channel (PDSCH) of a small base station when the macro base station and the small base station use different numerologies on the same carrier in the heterogeneous network, without reducing spectrum utilization rates of the macro base station and the small base station;
the terminal is configured to receive preset symbol position transmitted by the macro base station through the target signaling or directly acquire the preset symbol position through the communication protocol, so as to determine power regions of different transmission powers used by the macro base station in the control region of the time domain transmission unit, and demodulate, from the time domain transmission unit, a PDCCH according to a reference signal and a ratio between power values of different power regions;
the macro base station is further configured to transmit the ratio to the terminal via target signaling;
the terminal is further configured to demodulate, from the time domain transmission unit transmitted from the macro base station to the terminal, a PDCCH according to the ratio and a reference signal while reducing interference of the PDCCH of the macro base station on the PDSCH of the small base station.

* * * * *